United States Patent Office 2,971,960
Patented Feb. 14, 1961

2,971,960

PRODUCTION OF N-BROMINATED IMIDES AND HYDANTOINS

Thomas D. Waugh, 3645 Broadway, and Richard C. Waugh, 3915 Broadway, both of Boulder, Colo.

No Drawing. Filed Dec. 29, 1958, Ser. No. 783,076

11 Claims. (Cl. 260—309.5)

This invention relates to the production of certain types of N-brominated organic nitrogen compounds, and more specifically to the production of N-brominated organic compounds from the N-hydrogen compounds consisting of the imides of succinic and glutaric acids, hydantoin and lower alkyl 5-substituted hydantoins.

This application is a continuation-in-part of our application Ser. No. 524,822, filed July 27, 1955, now abandoned, a continuation-in-part of our application Ser. No. 487,474 (now abandoned), filed April 10, 1955, in turn a continuation-in-part of our application Ser. No. 214,019, filed March 5, 1951 (now forfeited).

Procedures previously employed for the production of N-brominated organic compounds by the bromination of N-hydrogen organic compounds, except for the procedures of our aforesaid applications, have generally given low yields or impure products, or both, and particularly have been exceedingly wasteful of bromine. In general, N-brominated organic compounds have been prepared by the treatment of a corresponding N-hydrogen organic compound in aqueous medium with molecular bromine in the presence of a strong base, or with alkali hypobromite prepared separately by treatment of molecular bromine with a strong base.

The reaction of bromine with an N-hydrogen organic compound wherein the nitrogen atom is adjacent to a carbonyl group may be considered as represented by the following Equation I, where R is hydrogen or an organic radical and R' is hydrogen or an acyl group and R and R' may be joined in a ring.

(I) 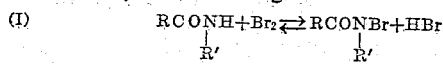

When a strong base is employed, such as NaOH, the base may be looked upon as reacting with HBr to produce NaBr and H₂O, for instance, thereby shifting the equilibrium to the right. However, only one half of the bromine used becomes incorporated in the desired N-brominated compound, the other half being converted into a by-product alkali bromide, from which it can be recovered only by special techniques, generally limited to large-scale operations. Also, the N-brominated compound thus obtained is usually contaminated with alkali bromide, unless large quantities of water are employed to dissolve and wash away the equimolecular quantities of alkali bromide formed along with the N-brominated product. Such use of large quantities of water often results in decreased yield of the desired product.

Among the objects of the present invention are to provide an improved method for the production of N-brominated organic compounds from certain N-hydrogen organic compounds, more particularly the imides of succinic and glutaric acids, hydantoin and lower alkyl 5-substituted hydantoins; to provide such a method which is efficient and particularly enables the bromine used in such bromination to enter into the bromination reaction to a substantially maximum extent; to provide such a method which can be made to produce comparatively high yields as well as to produce the desired product in a comparatively high state of purity; and to provide such a method which may be carried out with comparative ease.

Additional objects and the novel features of this invention will become apparent from the description which follows.

In accordance with the present invention, an N-brominated organic compound is produced by reacting bromine with one of the above N-hydrogen organic compounds in acid aqueous solution, and in the presence of a hypochlorite ion. The latter may be produced by molecular chlorine, or may be supplied by an alkali hypochlorite, such as NaOCl. The desired acidity may be produced initially by the starting compound or also by an acid, such as sulfuric acid, acetic acid or other inorganic or organic acid, or acid salt, which does not adversely affect the reaction. In general, the pH is preferably between 1.0 and 4.0, during at least a major portion of the reaction. Thus, the entire reaction may be carried out within the pH range of between 1.0 and 4.0, or the initial or terminal pH may be slightly below 1.0 or above 4.0. For certain purposes, it is desirable to produce as little of the chlorinated derivative of the starting compound as possible, in which case it appears desirable that the pH be above 1.0 for as much of the reaction time as possible.

The following Equation II and Equation III, wherein R and R' have the same meanings as previously, represent the probable reactions of the method of this invention:

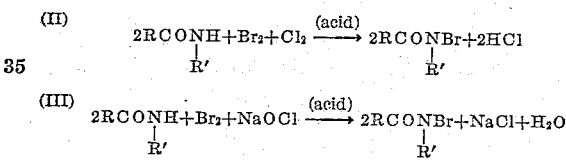

As will be evident from Equations II and III, all of the bromine is made available for bromination of the N-hydrogen organic compound involved, whereas in the prior caustic process, only one-half of the bromine is made available. Thus, a particular advantage of the present invention lies in the complete availability of the bromine for production of the desired brominated derivative. A further advantage is that HCl and NaCl are much more readily removed from the reaction product than the NaBr produced by the prior caustic process.

An unexpected result of the method of this invention lies in the fact that the reaction will proceed in acid medium, since the reaction of Equation I would proceed in basic medium but not in acid medium.

The following examples will serve to illustrate specific applications of the method of this application, but are not to be construed as limiting the same.

*Example 1*

(USE OF Br₂ AND Cl₂ IN THE PRODUCTION OF N-BROMOSUCCINIMIDE)

A total of 14 g. (0.2 mole) of chlorine was bubbled into a mixture of 40 g. (0.4 mole) of succinimide, 10 ml. (31.2 g. 0.2 mole) of bromine and 250 ml. of water at 30° C. during 20 minutes. After the mixture had been stirred for 30 minutes and cooled to 10° C., the solid was filtered off, washed with ice water and dried at 60° C. The product, identified as N-bromosuccinimide, weighed 47 g. (66% of the theoretical amount) and contained 45.7% active bromine, i.e., active halogen calculated as bromine, compared with the 44.9% bromine required by the formula C₄H₄O₂NBr. This slightly higher value was apparently due to the presence of a small amount of chlorine. A careful analysis for chlorine showed only 0.8% of chlorine in the product.

*Example 2*

(USE OF $Br_2$, $Cl_2$ AND $NaH_2PO_4$ IN THE PRODUCTION OF N-BROMOSUCCINIMIDE)

Chlorine was passed into a mixture of 10 g. (0.1 mole) of succinimide, 27.6 g. (0.2 mole) of sodium phosphate, monobasic, 8 g. (0.05 mole) of bromine and 250 ml. of water at 30° C. until 3.5 g. (0.05 mole) of chlorine had been absorbed, which required 5 minutes. The pH of the mixture stayed within the range of 1.8 and 3.0. After the mixture had been stirred for 10 minutes, it was cooled to 10° C. The solid product was filtered off, washed with ice water and dried at 60° C. The product, identified as N-bromosuccinimide, weighed 13 g. (72% of the theoretical amount) and contained 44.9% active bromine compared with the 44.9% required by the formula $C_4H_4BrNO_2$. A careful analysis for chlorine showed that no detectable amount was present. It will be noted that the procedure employed for the analysis for chlorine in the product of this and other examples was accurate to within 0.5%.

*Example 3*

(USE OF $Br_2$ AND NaOCl IN THE PRODUCTION OF N-BROMOSUCCINIMIDE)

A solution of sodium hypochlorite (128 ml.; 0.1 mole) was added during 20 minutes to a mixture of 1.6 g. (0.1 mole) of bromine, 20 g. (0.2 mole) of succinimide and 200 ml. of water at 35° C. The pH of the mixture stayed within the range of 1.2 and 3.1. The mixture was stirred for 30 minutes and then cooled to 5° C. The solid product was filtered off, washed with ice water and dried at 60° C. The product, identified as N-bromosuccinimide, weighed 24 g. (68% of the theoretical amount) and contained 44.9% active bromine compared with the 44.9% required by the formula $C_4H_4BrNO_2$. A careful analysis for chlorine showed that no detectable amount was present.

*Example 4*

(USE OF $Br_2$, NaOCl AND $CH_3COOH$ IN THE PRODUCTION OF N-BROMOSUCCINIMIDE)

A solution of sodium hypochlorite (139 ml.; 0.1 mole) was added during 20 minutes to a mixture of 16 g. (0.1 mole) of bromine, 20 g. (0.2 mole) of succinimide, 3.2 ml. (0.05 mole) of glacial acetic acid, and 200 ml. of water at 30° C. The pH of the mixture stayed within the range of 0.8 and 3.0. The mixture was stirred for 15 minutes and then cooled to 5° C. The solid product was filtered, washed with ice water and dried at 60° C. The product, identified as N-bromosuccinimide, weighed 27 g. (76% of the theoretical amount) and contained 45.0% active bromine compared with the 44.9% required by the formula $C_4H_4BrNO_2$. This slightly higher value was apparently due to the presence of a small amount of chlorine. A careful analysis for chlorine, however, showed no detectable amount.

*Example 5*

(USE OF $Br_2$, NaOCl AND $H_2SO_4$ IN THE PRODUCTION OF N-BROMOSUCCINIMIDE)

A solution of sodium hypochlorite (129 ml.; 0.1 mole) was added over 22 minutes to a mixture of 5 ml. (0.1 mole) of bromine, 20 g. (0.2 mole) of succinimide, 3 ml. (0.05 mole) of concentrated sulfuric acid and 200 ml. of water at 30° C. The mixture was cooled to 10° C. The solid product was filtered, washed with ice water and dried at 60° C. The product, identified as N-bromosuccinimide, weighed 25 g. (70% of the theoretical amount) and contained 45.4% active bromine, i.e., active halogen calculated as bromine, compared with the 44.9% required by the formula $C_4H_4O_2NBr$. This slightly higher value was apparently due to the presence of a small amount of chlorine. A careful analysis for chlorine, however, indicated that the product contained only 0.9% of chlorine.

*Example 6*

(USE OF $Br_2$, $Cl_2$ AND $NaH_2PO_4$ IN THE PRODUCTION OF N-BROMOGLUTARIMIDE)

Chlorine was passed into a mixture of 5.5 g. (0.05 mole) of glutarimide, 4 g. (0.025 mole) of bromine, 13.6 g. (0.1 mole) of monobasic sodium phosphate, and 100 ml. of water at 30° C. until 1.8 g. (0.025 mole) of chlorine had been absorbed. This required 3 minutes. The pH of the mixture stayed within the range of 2.0 and 3.2. After being stirred for 2 hours, the mixture was cooled to 5° C. The solid product was filtered off, washed with ice water and dried at room temperature. The product, identified as N-bromoglutarimide, weighed 3.3 g. (34% of the theoretical amount) and contained 42.2% active bromine, i.e., active halogen calculated as bromine, compared with the 41.7% bromine required by the formula $C_5H_6BrNO_2$. A careful analysis for chlorine indicated that the product contained 1.1% of chlorine.

*Example 7*

(USE OF $Br_2$ AND NaOCl IN THE PRODUCTION OF N-BROMOGLUTARIMIDE)

A solution of sodium hypochlorite (32 ml.; 0.05 mole) was added during 20 minutes to a mixture of 4 g. (0.025 mole) of bromine, 5.5 g. (0.05 mole) of glutarimide and 50 ml. of water at 35° C. The pH of the mixture stayed within the range of 0.9 and 3.4. The mixture was stirred for 30 minutes and then cooled to 5° C. The solid product was filtered off, washed with ice water and dried at room temperature. The N-bromoglutarimide thus produced weighed 3.5 g. (37% of the theoretical amount) and contained 40.5% active bromine compared with the 41.7% required by the formula $C_5H_6BrNO_2$. A careful analysis for chlorine indicated that the product contained 0.7% of chlorine.

*Example 8*

(USE OF $Br_2$, $Cl_2$ AND $NaH_2PO_4$ IN THE PRODUCTION OF 1,3-DIBROMOHYDANTOIN)

Chlorine was passed into a mixture of 10 g. (0.1 mole) of hydantoin, 55 g. (0.4 mole) of monobasic sodium phosphate, 16 g. (0.1 mole) of bromine and 300 ml. of water at 35° C. until 7 g. (0.1 mole) of chlorine had been absorbed. The pH of the mixture stayed within the range of 1.7 and 2.7. This required 10 minutes. After being stirred for 30 minutes, the mixture was cooled to 5° C. The solid product was filtered off, washed with ice water and dried at 60° C. The product, identified as 1,3-dibromohydantoin, weighed 18 g. (69% of the theoretical amount) and contained 58.3% active bromine compared with the 62.0% required by the formula $C_3H_2Br_2N_2O_2$. A careful analysis for chlorine indicated that no detectable amount was present. Recrystallization of the product from 2 N nitric acid yielded a product containing 61.7% active bromine. This latter product darkened on exposure to light.

*Example 9*

(USE OF $Br_2$ AND NaOCl IN THE PRODUCTION OF 1,3-DIBROMOHYDANTOIN)

A solution of sodium hypochlorite (129 ml.; 0.1 mole) was added during 40 minutes to a mixture of 10 g. (0.1 mole) of hydantoin, 16 g. (0.1 mole) of bromine and 400 ml. of water at 35° C. The pH of the mixture stayed within the range of 2.1 and 3.0. The mixture was stirred for 1.5 hours and then cooled to 5° C. The solid product was filtered off, washed with ice water and dried at 60° C. The product, identified as 1,3-dibromohydantoin, weighed 8 g. (31% of the theoretical amount) and contained 57.5% active bromine compared with the 62.0% required by the formula $C_3H_2Br_2N_2O_2$. A careful analysis for chlorine indicated that the product contained no detectable amount of chlorine.

Example 10

(USE OF $Br_2$ AND $Cl_2$ IN THE PRODUCTION OF MONO-BROMO-5,5-DIMETHYLHYDANTOIN)

Chlorine (14 g.; 0.2 mole) was passed into a mixture of 50 g. (0.4 mole) of 5,5-dimethylhydantoin, 10 ml. (31.2 g.; 0.2 mole) of bromine and 400 ml. of water at 20° C. during 25 minutes. After the mixture had been cooled to 10° C., the solid was filtered off, washed with ice water and dried at 60° C. The product, identified as monobromo-5,5-dimethylhydantoin, thus recovered weighed 58 g. (70% of the theoretical amount) and contained 38.0% active bromine compared with the 38.3% required by the formula $C_5H_7O_2N_2Br$. This compound has been designated in the literature as 3-bromo-5,5-dimethylhydantoin, but there is evidence to indicate that it is probably 1-bromo-5,5-dimethylhydantoin; therefore, this compound is designated here simply as monobromo-5,5-dimethylhydantoin. A careful analysis for chlorine showed no detectable amount.

Example 11

(USE OF $Br_2$, NaOCl AND $H_2SO_4$ IN THE PRODUCTION OF MONOBROMO-5,5-DIMETHYLHYDANTOIN)

A solution of sodium hypochlorite (187 ml.; 0.1 mole) was added during 20 minutes to a mixture of 5 ml. (0.1 mole) of bromine, 25 g. (0.2 mole) of dimethylhydantoin, 3 ml. (0.05 mole) of concentrated sulfuric acid and 200 ml. of water at 25° C. The mixture was stirred for 10 minutes and then cooled to 5° C. The solid product was filtered off, washed with ice water and dried at 60° C. The product, identified as monobromo-5,5-dimethylhydantoin, weighed 29 g. (71% of the theoretical amount) and contained 39.7% active bromine, i.e., active halogen calculated as bromine, compared with the 38.3% bromine required by the formula $C_5H_7O_2N_2Br$. This slightly higher value was apparently due to the presence of a small amount of chlorine; a careful analysis for chlorine, however, indicated that the product contained only 1.2% of chlorine.

Example 12

(USE OF $Br_2$ AND $Cl_2$ IN THE PRODUCTION OF 1,3-DIBROMO-5,5-DIMETHYLHYDANTOIN)

Chlorine (14 g.; 0.2 mole) was bubbled into a mixture of 25 g. (0.2 mole) of dimethylhydantoin, 10 ml. (0.2 mole) of bromine and 1200 ml. of water at 40° C. during 21 minutes. The pH of the mixture stayed within the range of 0.8 and 1.1. After the mixture had been stirred for 30 minutes and cooled to 5° C., the solid was filtered off, washed with ice water and dried at 60° C. The product, identified as 1,3-dibromo-5,5-dimethylhydantoin, weighed 32 g. (56% of the theoretical amount) and contained 55.7% active bromine compared with 55.9% required by the formula $C_5H_6O_2N_2Br_2$. A careful analysis for chlorine showed no detectable amount present.

Example 13

(USE OF $Br_2$, $Cl_2$ AND $NaH_2PO_4$ IN THE PRODUCTION OF 1,3-DIBROMO-5,5-DIMETHYLHYDANTOIN)

Chlorine was passed into a mixture of 12.5 g. (0.1 mole) of 5,5-dimethylhydantoin, 55.2 g. (0.4 mole) of monobasic sodium phosphate, 16 g. (0.1 mole) of bromine and 300 ml. of water at 55° C. until 7 g. (0.1 mole) of chlorine had been absorbed. This required 10 minutes. The pH of the mixture stayed within the range of 2.2 and 2.8. The mixture was cooled to 10° C. and the solid product was filtered off, washed with ice water and dried at 60° C. The product, identified as 1,3-dibromo-5,5-dimethylhydantoin, weighed 23 g. (80% of the theoretical amount) and contained 55.8% active bromine compared with the 55.9% required by the formula $C_5H_6Br_2N_2O_2$. A careful analysis for chlorine showed that no detectable amount was present.

Example 14

(USE OF $Br_2$ AND NaOCl IN THE PRODUCTION OF 1,3-DIBROMO-5,5-DIMETHYLHYDANTOIN)

A solution of sodium hypochlorite (256 ml.; 0.2 mole) was added during 30 minutes to a mixture of 32 g. (0.2 mole) of bromine, 25 g. (0.2 mole) of 5,5-dimethylhydantoin and 400 ml. of water at 55° C. The pH of the mixture stayed within the range of 1.1 and 2.8. The mixture was stirred for 30 minutes and then cooled to 5° C. The solid product was filtered off, washed with ice water and dried at 60° C. The 1,3-dibromo-5,5-dimethylhydantoin thus produced weighed 42 g. (74% of the theoretical amount) and contained 56.0% active bromine compared with the 55.9% required by the formula $C_5H_6Br_2N_2O_2$. This slightly higher value was apparently due to the presence of a small amount of chlorine. A careful analysis for chlorine indicated that the product contained 0.6% of chlorine.

Example 15

(USE OF $Br_2$, NaOCl AND $CH_3COOH$ IN THE PRODUCTION OF 1,3-DIBROMO-5,5-DIMETHYLHYDANTOIN)

A solution of sodium hypochlorite (250 ml.; 0.2 mole) was added during 20 minutes to a mixture of 22 g. (0.2 mole) of bromine, 25 g. (0.2 mole) of 5,5-dimethylhydantoin, 6.2 ml. (0.1 mole) of glacial acetic acid and 200 ml. of water at 55° C. The mixture was stirred for 30 minutes and then cooled to 10° C. The solid product was filtered, washed with ice water and dried at 60° C. The product, identified as 1,3-dibromo-5,5-dimethylhydantoin, weighed 53 g. (93% of the theoretical amount) and contained 55.8% active bromine compared with the 55.9% required by the formula $C_5H_6Br_2N_2O_2$. A careful analysis for chlorine showed that no detectable amount was present.

Example 16

(USE OF $Br_2$, NaCl AND $H_2SO_4$ IN THE PRODUCTION OF 1,3-DIBROMO-5,5-DIMETHYLHYDANTOIN)

Bromine (10 ml.; 0.2 mole) was added to a solution of 25 g. (0.2 mole) of dimethylhydantoin, 3 ml. (0.05 mole) of concentrated sulfuric acid and 200 ml. of water at 40° C. A solution of sodium hypochlorite (250 ml.; 0.2 mole) was then added over 30 minutes. The pH of the solution stayed within the range of 1.0 and 3.5. The mixture was stirred for 45 minutes and then cooled to 8° C. The solid product was filtered, washed with ice water and dried at 60° C. The 1,3-dibromo-5,5-dimethylhydantoin thus produced weighed 49 g. (85% of the theoretical amount) and contained 56.6% active bromine, i.e., active halogen calculated as bromine, compared with the 55.9% required by the formula $C_5H_6O_2N_2Br_2$. This slightly higher value was apparently due to the presence of a small amount of chlorine; a careful analysis for chlorine, however, indicated that the product contained only 1.4% of chlorine.

Example 17

(USE OF $Br_2$ AND $Cl_2$ IN THE PRODUCTION OF MONOBROMO-5-ETHYL-5-METHYLHYDANTOIN)

Chlorine was passed into a mixture of 28.5 g. (0.2 mole) of 5-ethyl-5-methylhydantoin, 5 ml. (15.6 g.; 0.1 mole) of bromine and 300 ml. of water at 45° C. until 6 g. (0.1 mole) of chlorine had been absorbed. This required 10 minutes. After the mixture had been stirred for 15 minutes, it was cooled to 5° C. The solid product was filtered off, washed with ice water and dried at 60° C. The product, identified as monobromo-5-ethyl-5-methylhydantoin, weighed 37 g. (84% of the theoretical amount) and contained 36.7% active bromine, i.e., active halogen calculated as bromine, compared with the 36.2% required by the formula $C_6H_9N_2O_2Br$. Although this slightly higher value suggested that it contained a small amount of chlorine, a careful analysis for chlorine failed to detect any. The designation of similar compounds in the literature would indicate that this compound is 3-bromo-5-ethyl-5-methylhydantoin. More recent work, however, suggests that it is 1-bromo-5-ethyl-5-methylhydantoin. Therefore, it is here designated only as monobromo-5-ethyl-5-methylhydantoin.

*Example 18*

(USE OF Br₂, NaOCl AND CH₃COOH IN THE PRODUCTION OF MONOBROMO-5-ETHYL-5-METHYLHYDANTOIN)

A solution of sodium hypochlorite (129 ml.; 0.1 mole) was added during 45 minutes to a mixture of 28.5 g. (0.2 mole) of 5-ethyl-5-methylhydantoin, 3.1 ml. (0.05 mole) of glacial acetic acid, 16 g. (0.1 mole) of bromine, and 300 ml. of water at 50° C. The pH of the mixture stayed within the range of 1.2 and 3.1. The mixture was stirred for 15 minutes and then cooled to 5° C. The solid product was filtered off, washed with ice water and dried at 60° C. The product, identified as monobromo-5-ethyl-5-methylhydantoin, weighed 39 g. (88% of the theoretical amount) and contained 37.1% active bromine, i.e., active halogen calculated as bromine, compared with the 36.2% required by the formula $C_6H_9BrN_2O_2$. This slightly higher value was apparently due to the presence of a small amount of chlorine. A careful analysis for chlorine indicated that the product contained 1.3% of chlorine. The designation of similar compounds in the literature would indicate that this compound is 3-bromo-5-ethyl-5-methylhydantoin. More recent work, however, suggests that it is 1-bromo-5-ethyl-5-methylhydantoin. Therefore, it is here designated only as monobromo-5-ethyl-5-methylhydantoin.

*Example 19*

(USE OF Br₂ AND NaOCl IN THE PRODUCTION OF 1,3-DIBROMO-5-ETHYL-5-METHYLHYDANTOIN)

A solution of sodium hypochlorite (256 ml.; 0.2 mole) was added during 30 minutes to a mixture of 32 g. (0.2 mole) bromine, 28.5 g. (0.2 mole) of 5-ethyl-5-methylhydantoin and 200 ml. of water at 35° C. The pH of the mixture stayed within the range of 0.9 and 6.7. The mixture was stirred for 15 minutes and then cooled to 5° C. The solid product was filtered off, washed with ice water and dried at 60° C. The product, identified as 1,3 - dibromo-5-ethyl - 5 - methylhydantoin, weighed 55 g. (92% of the theoretical amount) and contained 53.6% active bromine, i.e., active halogen calculated as bromine, compared with the 53.3% required by the fromula $C_6H_8Br_2N_2O_2$. This slightly higher value was apparently due to the presence of a small amount of chlorine. A careful analysis for chlorine indicated that the product contained less than 0.5% of chlorine.

*Example 20*

(USE OF Br₂, NaOCl AND CH₃COOH IN THE PRODUCTION OF 1,3-DIBROMO-5-ETHYL-5-METHYLHYDANTOIN)

A solution of sodium hypochlorite (270 ml.; 0.2 mole) was added during 25 minutes to a mixture of 32 g. (0.2 mole) of bromine, 28.5 g. (0.2 mole) of 5-ethyl-5-methylhydantoin, 6.2 ml. (0.1 mole) of glacial acetic acid and 80 ml. of water at 35° C. The pH of the mixture stayed within the range of 0.9 and 4.0. The mixture was stirred for 1 hour after cooling to 10° C. The solid product was filtered, washed with ice water and dried at 60° C. The product, identified as 1,3-dibromo-5-ethyl-5-methylhydantoin weighed 52 g. (87% of the theoretical amount) and contained 53.4% active bromine compared with the 53.3% required by the formula $C_6H_8Br_2N_2O_2$. This slightly higher value was apparently due to the presence of a small amount of chlorine. A careful analysis for chlorine indicated that the product contained 0.9% chlorine.

*Example 21*

(USE OF Br₂, NaOCl AND H₂SO₄ IN THE PRODUCTION OF MONOBROMO-5-ISOBUTYL-5-METHYLHYDANTOIN)

A solution of sodium hypochlorite (64 ml.; 0.5 mole) was added during 15 minutes to a mixture of 8 g. (0.05 mole) of bromine, 17.5 g. (0.1 mole) of 5-isobutyl-5-methylhydantoin, 0.75 ml. (0.01 mole) of concentrated sulfuric acid and 300 ml. of water at 35° C. The mixture was stirred for 2 hours and then cooled to 5° C. The solid product was filtered off, washed with ice water and dried at 60° C. The product, identified as monobromo-5-isobutyl-5-methylhydantoin, weighed 21 g. (84% of the theoretical amount) and contained 32.4% active bromine compared with the 32.1% required by the formula $C_8H_{13}BrN_2O_2$. This slightly higher value was apparently due to the presence of a small amount of chlorine. A careful analysis for chlorine, however, indicated that the product contained less than 0.5% of chlorine. The designation of similar compounds in the literature would indicate that this compound is 3-bromo-5-isobutyl-5-methylhydantoin. More recent work, however, suggests that it is 1-bromo-5-isobutyl-5-methylhydantoin. Therefore, it is here designated only as monobromo-5-isobutyl-5-methylhydantoin.

*Example 22*

(USE OF Br₂, Cl₂ AND NaH₂PO₄ IN THE PRODUCTION OF 1,3-DIBROMO-5-ISOBUTYL-5-METHYLHYDANTOIN)

Chlorine was passed into a mixture of 8.5 g. (0.05 mole) of 5-isobutyl-5-methylhydantoin, 27.5 g. (0.2 mole) of monobasic sodium phosphate, 8 g. (0.05 mole) of bromine and 400 ml. of water at 55° C. until 3.5 g. (0.05 mole) of chlorine had been absorbed. This required 5 minutes. The pH of the mixture stayed within the range of 2.1 and 2.8. After being stirred for 45 minutes, the mixture was cooled to 5° C. The solid product was filtered off, washed with ice water and dried at 60° C. The product, identified as 1,3-dibromo-5-isobutyl-5-methylhydantoin, weighed 13 g. (77% of the theoretical amount) and contained 45.6% active bromine compared with the 48.8% required by the formula $C_8H_{12}Br_2N_2O_2$. A careful analysis for chlorine showed no detectable amount.

*Example 23*

(USE OF Br₂ AND NaOCl IN THE PRODUCTION OF 1,3-DIBROMO-5-ISOBUTYL-5-METHYLHYDANTOIN)

A solution of sodium hypochlorite (64.5 ml.; 0.05 mole) was added alternately with bromine (8 g.; 0.05 mole) during 40 minutes to a solution of 8.5 g. (0.05 mole) of 5-isobutyl-5-methylhydantoin and 400 ml. of water at 55° C. The pH of the mixture stayed within the range of 1.1 and 4.6. The mixture was stirred for 2 hours and then cooled to 5° C. The solid product was filtered off, washed with ice water and dried at 60° C. The product, identified as 1,3-dibromo-5-isobutyl-5-methylhydantoin, weighed 15 g. (92% of the theoretical amount) and contained 46.8% active bromine compared with the 48.8% required by the formula $C_8H_{12}Br_2N_2O_2$. A careful analysis for chlorine indicated that the product contained 0.9% of chlorine.

In addition to the specific conditions described above, the invention may be in many instances carried out at other temperatures, such as from the freezing point of the solution to room temperature or above. For example, it is preferred to carry out the reaction at from 0° C. to 60° C., in the production of N-bromo-succinimide and from 30° C. to 90° C. in the production of 1,3-dibromo-5,5-dimethylhydantoin.

An additional surprising result of this invention may also be mentioned. An N-hydrogen organic compound, particularly an N-hydrogen organic compound wherein the nitrogen atom is adjacent to a carbonyl group, may be directly chlorinated in aqueous medium by the reaction represented by the following Equation IV, which is predominantly toward the right, where R and R' have the same meaning as before:

(IV) 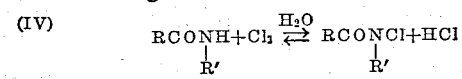

Since both chlorine and bromine are halogens, it might be assumed that such an N-hydrogen organic compound might react directly with bromine in a similar manner, as represented by the reaction represented by Equation V below, where R and R' have the same meaning as before:

(V)
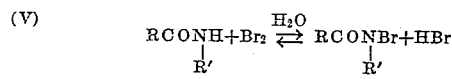

However, the equilibrium in the above reaction V is apparently completely toward the left, i.e., there were no isolable products when bromine was added to an N-nitrogen organic compound in which the nitrogen atom is adjacent to a carbonyl group, such as acetamide, succinimide or hydantoin, while upon the addition of HBr to a brominated derivative of acetamide, succinimide or hydantoin, for example, the parent compound was produced. It will be noted that although the reaction of Equation IV will take place in an acid medium, the reaction of Equation V still is completely toward the left in acid medium.

As will also be evident from Equations II and III, given previously, the N-hydrogen organic compound was available for reaction with chlorine but without production of the corresponding N-chloro organic compound, in other than extremely small amounts in a few instances. Therefore, it is a further unexpected result that the N-chloro compound was not produced and that the N-brominated derivative was produced in a high degree of purity and in good yields.

What is claimed is:

1. A method of producing an N-brominated organic compound from an N-hydrogen organic compound selected from the group consisting of succinimide, glutarimide, hydantoin and 5,5-di lower alkyl hydantoins, which comprises treating said N-hydrogen organic compound with bromine in an aqueous solution containing a hypochlorite ion reagent and at a pH of about between 1.0 and 4.0.

2. A method according to claim 1, wherein said hypochlorite ion reagent is produced by elemental chlorine.

3. A method according to claim 1, wherein said hypochlorite ion reagent is provided by an alkali hypochlorite.

4. A method according to claim 1, wherein bromine, chlorine and monobasic sodium phosphate are introduced into said solution.

5. A method according to claim 1, wherein bromine, an alkali hypochlorite and an acid selected from the group consisting of acetic acid and sulfuric acid are introduced into said solution.

6. A method according to claim 1, wherein the N-hydrogen organic compound is succinimide.

7. A method according to claim 1, wherein the N-hydrogen organic compound is hydantoin.

8. A method according to claim 1, wherein the N-hydrogen organic compound is 5,5-dimethylhydantoin.

9. A method according to claim 1, wherein the N-hydrogen organic compound is 5-ethyl-5-methylhydantoin.

10. A method according to claim 1, wherein the N-hydrogen organic compound is 5-isobutyl-5-methylhydantoin.

11. A method of producing an N-brominated organic compound from an N-hydrogen organic compound selected from the group consisting of succinimide, glutarimide, hydantoin, 5,5-dimethylhydantoin, 5-methyl-5-ethylhydantoin and 5-methyl-5-isobutylhydantoin, which comprises treating said N-hydrogen organic compound with bromine in an acid aqueous solution containing a hypochlorite ion reagent and at a pH generally between 1.0 and 4.0.

References Cited in the file of this patent

UNITED STATES PATENTS

| | | |
|---|---|---|
| 2,013,791 | Sachs et al. | Sept. 10, 1935 |
| 2,211,465 | Jewel et al. | Aug. 13, 1940 |
| 2,472,361 | Arsem | June 7, 1949 |